G. EBER.
CAMPING ATTACHMENT FOR AUTOMOBILES.
APPLICATION FILED APR. 30, 1917.
1,287,924.
Patented Dec. 17, 1918.
3 SHEETS—SHEET 3.
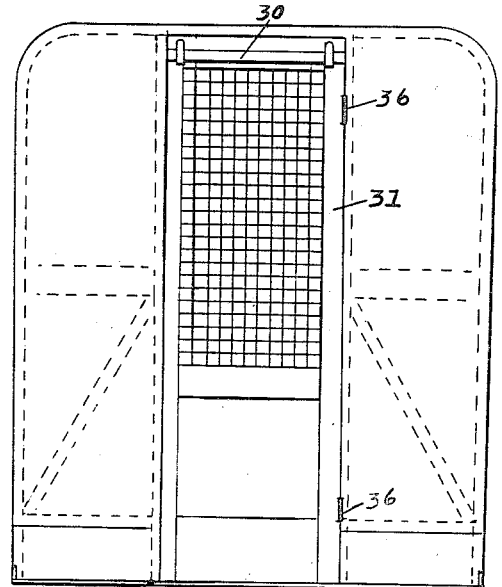
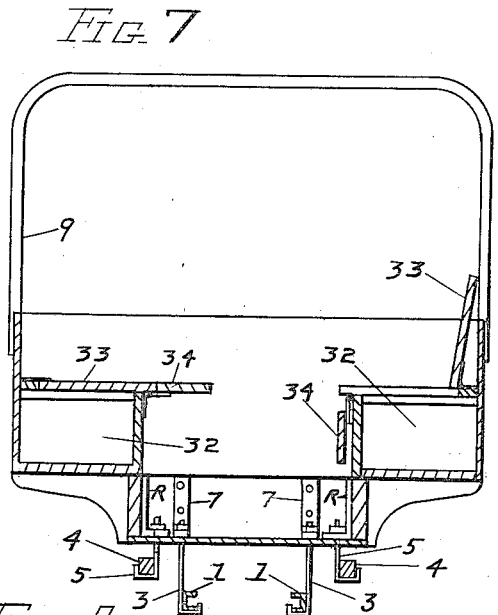
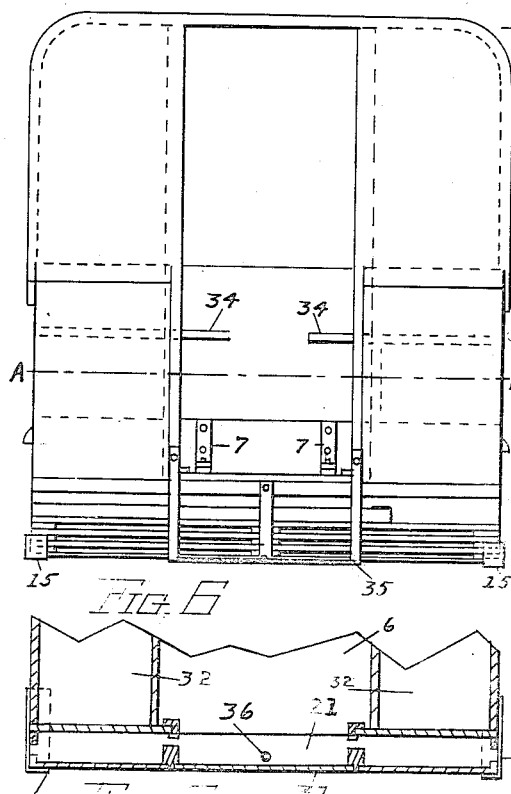
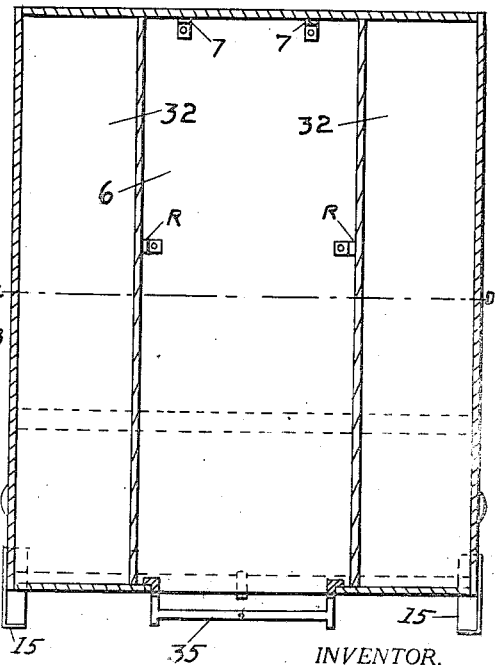
INVENTOR.
George Eber
BY
Fred E. Mefford
ATTORNEYS.

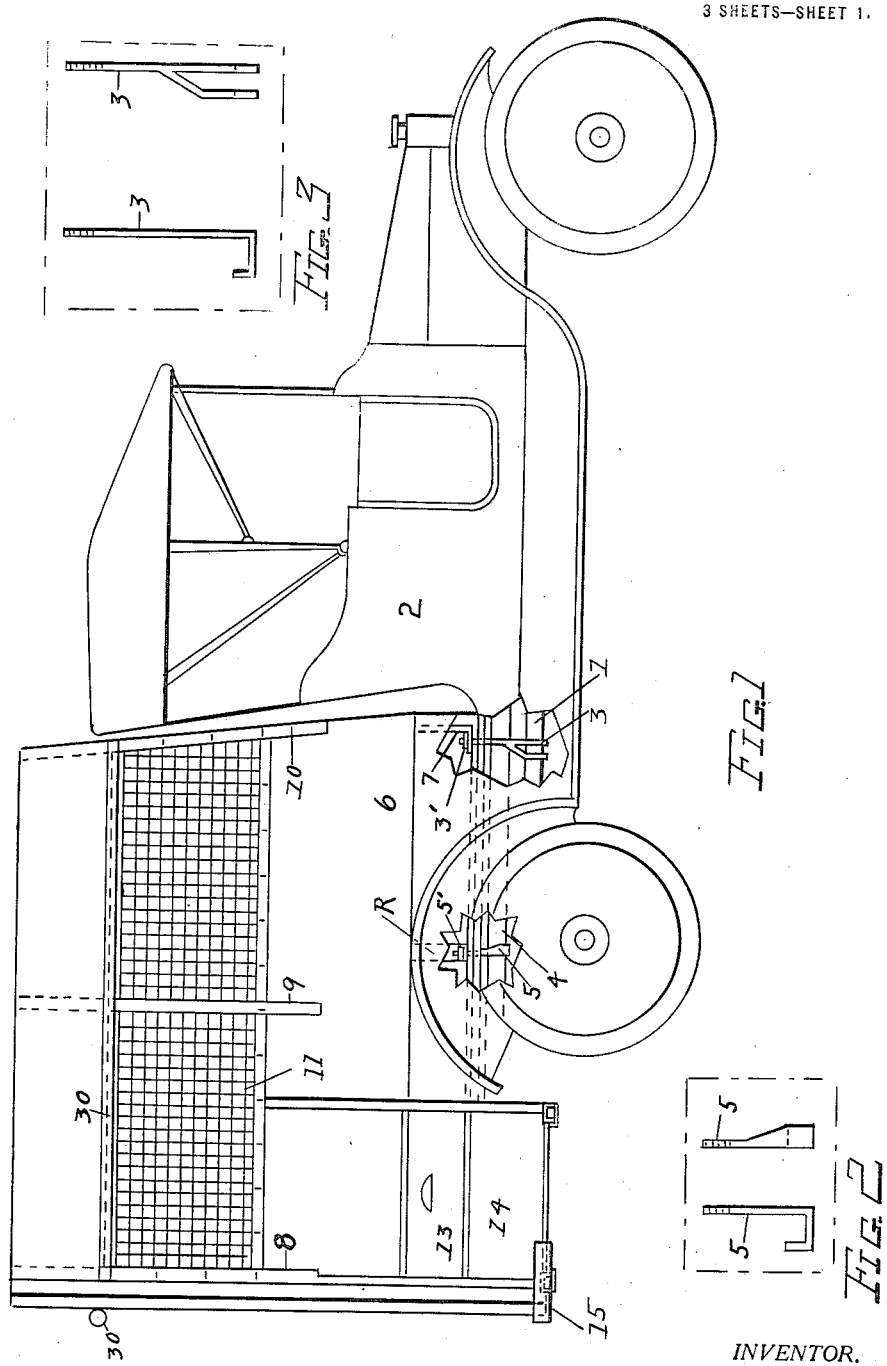

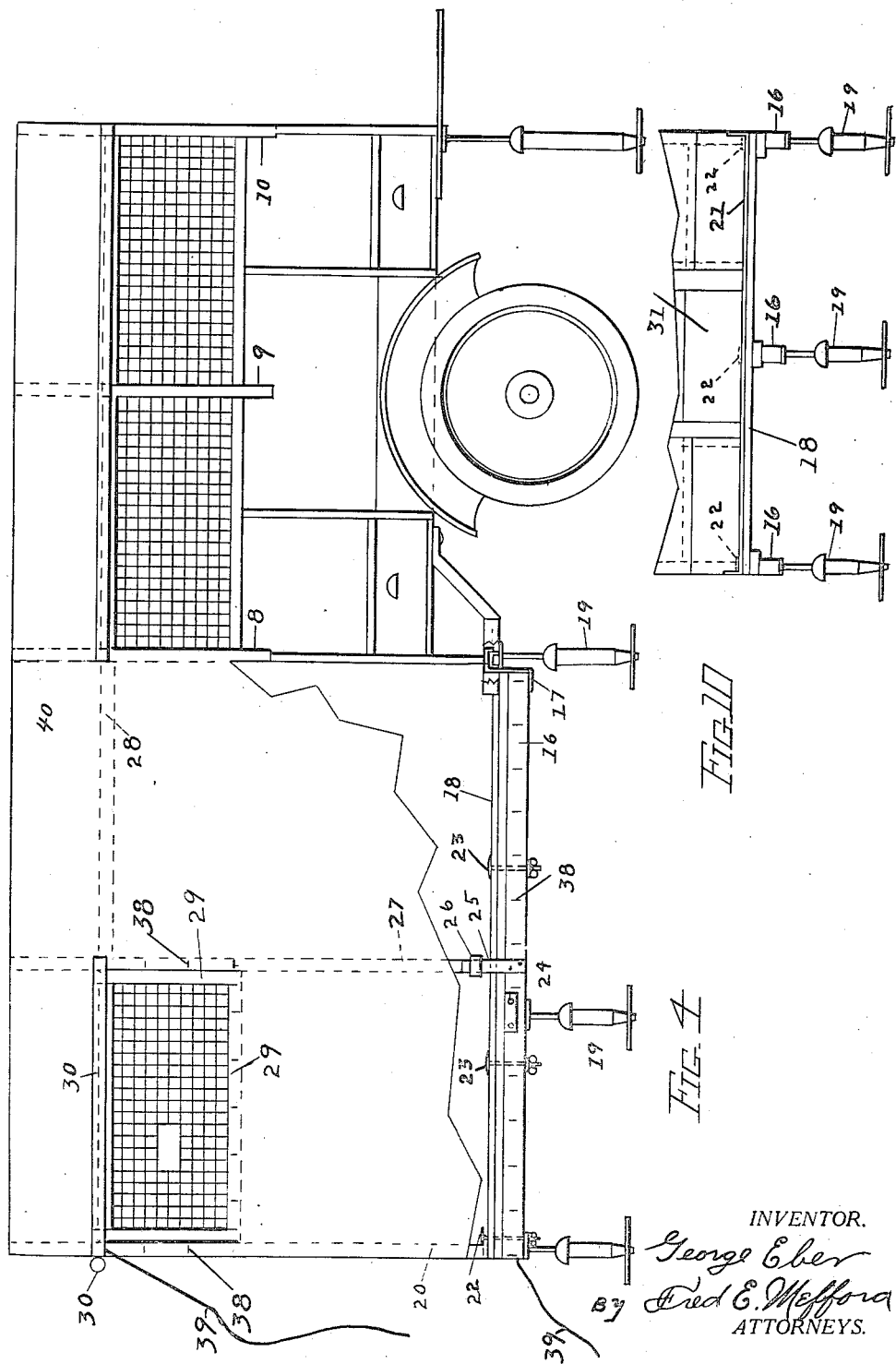

UNITED STATES PATENT OFFICE.

GEORGE EBER, OF SAN DIEGO, CALIFORNIA.

CAMPING ATTACHMENT FOR AUTOMOBILES.

1,287,924.           Specification of Letters Patent.      Patented Dec. 17, 1918.

Application filed April 30, 1917. Serial No. 165,398.

*To all whom it may concern:*

Be it known that I, GEORGE EBER, a citizen of the United States, residing at San Diego, in the county of San Diego and State of California, have invented a new and useful Camping Attachment for Automobiles, of which the following is a specification.

My invention relates to camping devices which may be mounted on an automobile or a trailer; and has for its objects the provision of a sleeping apartment adapted to be mounted to a runabout car or to a trailer; and a collapsible supplementary apartment which may be taken down and stored beneath said first named apartment; other objects will appear as the description progresses.

I attain these and other objects by the construction shown in the accompanying drawings, which disclose the preferred form of the invention and are for illustrative purposes; it being understood that I do not confine myself to the particular construction herein shown, but that within the scope of what is hereinafter claimed, divers changes in the form, size and minor details of the structure may be made without departing from the spirit of the invention.

Similar reference characters refer to like parts throughout the several views.

Figure 1, is a side elevation of a Ford runabout automobile with my invention mounted thereon as it appears when the automobile is ready for traveling, parts of the automobile and of my invention being broken away to show the manner in which the invention is secured to the automobile; Fig. 2, a rear and side elevation of the rear clip 5; Fig. 3, a rear and side elevation of the front clip 3; Fig. 4, a side elevation of a trailer with an adaptation of my invention mounted thereon and the rear apartment set up; Fig. 5, an elevation of the rear bow section removed; Fig. 6, an elevation of the rear of the front apartment; Fig. 7, a vertical cross section of the front apartment on the line C—D of Fig. 8; Fig. 8, a plan view of a cross section on the line A—B of Fig. 6; Fig. 9, a fragmentary plan view of a cross section showing the bow section of the rear apartment, in place as shown in Fig. 1; and Fig. 10, a fragmentary rear view of the collapsible apartment supported by jacks 19.

The invention comprises a stationary front apartment adapted to be mounted on an automobile and a collapsible rear apartment which may be taken down and stored in a receptacle and brackets mounted on said front apartment.

Referring specifically to Fig. 1 of the drawings, the reference numeral 2 denotes a Ford runabout automobile; 1, a channel iron of the automobile; 3, a clip which hooks under said channel; 4, a beam of the automobile; 5, a clip which hooks under said beam; 6, the box portion of the front apartment; 7, angles mounted in the box 6 to which the clip 3 is bolted; R, angles mounted in the box 6 to which the clip 5 is bolted; 8, 9, and 10, bows rigidly mounted on the box 6 and covered with canvas except at the portions occupied by the screens 11; 13, drawers mounted within said box 6; 14, a receptacle mounted under said box 6; 15, brackets mounted on the rear corners of said receptacle 14. Referring to Fig. 4, the numeral 16 denotes the joists of the collapsible rear apartment; 17, the hooks by which the joists are secured to the front apartment; 18, the floor laid upon said joists; 19, jacks which support said joists; 20, the rear bow portion of the collapsible apartment; 21, a metal plate mounted on the bottom of the rear bow, by which it is secured to the floor by the bolts 22; 23, bolts by which the floor is secured to the joists 16; 24, a hinged joint in the joists 16; 25, a metal standard mounted on each of the outside joists and having a collar 26 in which the bow 27 is mounted; 28, longitudinal stays to lend rigidity to the frame work; 29, a rectangular frame carrying a wire screen; and 30, curtains rolled up.

In Fig. 5, 31 is a door in the rear bow portion of the collapsible apartment; and 30, a curtain rolled up.

In Fig. 7, 32, 32, are longitudinal rectangular compartments within the box 6 having hinged lids 33 on the top thereof and swing shelves 34 on the front thereof.

In Fig. 8, 35 is a bracket on the rear of the front apartment.

The rigidly constructed front apartment is placed upon the automobile 2 as shown in Fig. 1 and secured to said automobile by the use of the clips 3 and 5. These clips are provided with threaded upper ends and hooked lower ends and are hooked under the channels 1 and beams 4 of the automobile and the threaded ends are thrust through the bottom of the box portion 6 and the angles 7 and 8, mounted in said box portion 6, and are held firmly in place by nuts 3' and 5'.

The collapsible apartment is assembled as follows: The joists 16 are hooked to the receptacle 14 by the hooks 17 on said joists; the jacks 19 are disposed as supports; the sectional floor 18 is disposed upon said joists 16 and bolted thereto by bolts 23; the bow 27 is inserted within the collar 26 on the standard 25; the rear bow portion 20 is mounted upon the floor 18 and secured thereto by bolts 22 running through the plates 21 and through the joists 16; the screen frame 29 is disposed between the bows 27 and the rear bow and held in position by dowel pins; the stay 28 is disposed between the bow 8 and the bow 27 and held in position by dowel pins; the canvas 40 is disposed over the bows and buttoned to the structure by the aid of the staples 38 and the cord 39 which runs through said staples after said canvas has been buttoned thereon. The curtains 30 may be buttoned to staples provided and held in the same maner. The shelves 34 are extended horizontally and held by any suitable means and in conjunction with the lids 33, provide places upon which mattresses may be disposed thereby providing two beds.

The compartments 32 are provided so that the bedding and clothing may be stored out of the way when traveling and the drawers 13 are provided as supplementary storage receptacles for cooking utensils, food and so forth. When traveling the shelves 34 are lowered as shown in Fig. 7, and the lids 33 may be used as seats for passengers.

The rear apartment is entered through the door way which is provided with the screen door 31, hinged to the door frame by the hinges 36.

If it is desired to use the automobile at the time the invention is set up ready for camping, the clips 3 and 5 are loosened and removed and the front apartment slightly lifted; when the automobile may be run from under the front apartment and supports placed under said apartment.

When it is desired to resume traveling, the automobile is backed under said apartment and the clips 3 and 5 replaced; and the rear collapsible apartment is taken down and stored in places provided as follows: The sectional floor 18 is stored in the receptacle 14, the joists 16 are folded and laid upon the floor sections within said receptacle; the rear bow portion is disposed in the brackets 15 and bolted to the bracket 35; the bow 27 is disposed between the bow 8 and the rear bow portion 20.

The other parts of the rear apartment may be stored in the receptacle 14 or any other desired compartments.

When the invention is used with a trailer as shown in Fig. 4, the members of the collapsible apartment are stored in the trailer when traveling.

I claim—

1. A camping attachment for automobiles, comprising a rigidly constructed apartment adapted to be mounted on an automobile of the class described and a collapsible apartment adapted to be taken down and stored away for transportation; said rigidly constructed apartment comprising a box portion; clips mounted in the bottom of said box portion at the front end thereof and hooked under the channel irons of said automobile whereby the front of said box portion is secured to said automobile; clips mounted in the bottom of said box portion and hooked under the beams of said automobile, whereby the rear of said box portion is secured to said automobile; longitudinal compartments disposed within said box portion; lids hinged on said compartments; shelves hinged on the front of said compartments; drawers disposed underneath said compartments; a transversely disposed compartment disposed underneath said drawers in alinement therewith; brackets mounted on the rear corner of said transverse compartment, adapted to hold the vertically disposed bow members of said collapsible apartment; bows mounted on said box portion; screens mounted on said bows adjacent to the top of the sides of said box portion; fabric mounted on said bows; and curtains adapted to cover said screens; said collapsible apartment comprising a plurality of hingedly jointed longitudinally disposed joists; hooks mounted on the front ends of said joists and hooked to said transverse compartment; supports under said joists; a sectional floor disposed on said joists; a bow member mounted on the outside joists; a rear bow member mounted on said floor; a frame having a screen therein mounted between said bow members; curtains adapted to cover said screens; a fabric covering for said apartment; a door mounted in said rear bow member; and a curtain for said door; for the purposes set forth.

2. A camping attachment for automobiles of the class described comprising a demountable rigidly constructed apartment in combination with an automobile, comprising a box portion; clips on said box portion whereby said box portion is secured to said automobile; a frame work mounted on said box portion; fabric mounted on said frame work; longitudinal storage compartments disposed within said box portion; lids on said longitudinal compartments; a transverse storage receptacle disposed under the rear of said box portion; brackets mounted on said transverse receptacle to hold members of a collapsible apartment when traveling; a plurality of joists hooked to said receptacle and having supports whereby they are held level; a floor disposed on said joists; a removable frame work mounted on said floor and two of said joists; a door mounted in the rear end of said frame work and fabric mounted on said frame work; for the purposes set forth.

3. A camping attachment for automobiles comprising a box disposed on an automobile; clips on said box whereby said box is secured to said automobile; a frame work mounted on the top of said box; screens mounted in said frame work; a canvas mounted on said frame work; longitudinal storage compartments within said box; lids on said compartments; transverse drawers mounted on the rear of said box under said longitudinal compartments; a transverse receptacle disposed under said drawers; a series of folding joists having hooks thereon and hooked to the rear of said transverse receptacle; supports under said joists; a removable floor on said joists, a removable frame work mounted on said floor and the two outside joists of said series; a screen mounted in the side of said frame work; and a door mounted in the rear of said frame work; for the purposes set forth.

4. A camping attachment for automobiles of the class described comprising a box; a frame work on said box; screens mounted in said frame work; fabric on the said frame work; longitudinal storage compartments within said box; lids on said compartments; transverse drawers in said box adapted to pull outward, disposed under said longitudinal storage compartments; a bracket on the rear of said box; a series of folding joists having hooks thereon and hooked to said bracket; supports under said joists; a sectional removable floor secured to said joists; a frame work mounted on said floor and joists; fabric on said frame work; and a door mounted in the rear of said frame work; for the purposes set forth.

GEORGE EBER.